Figure 1:
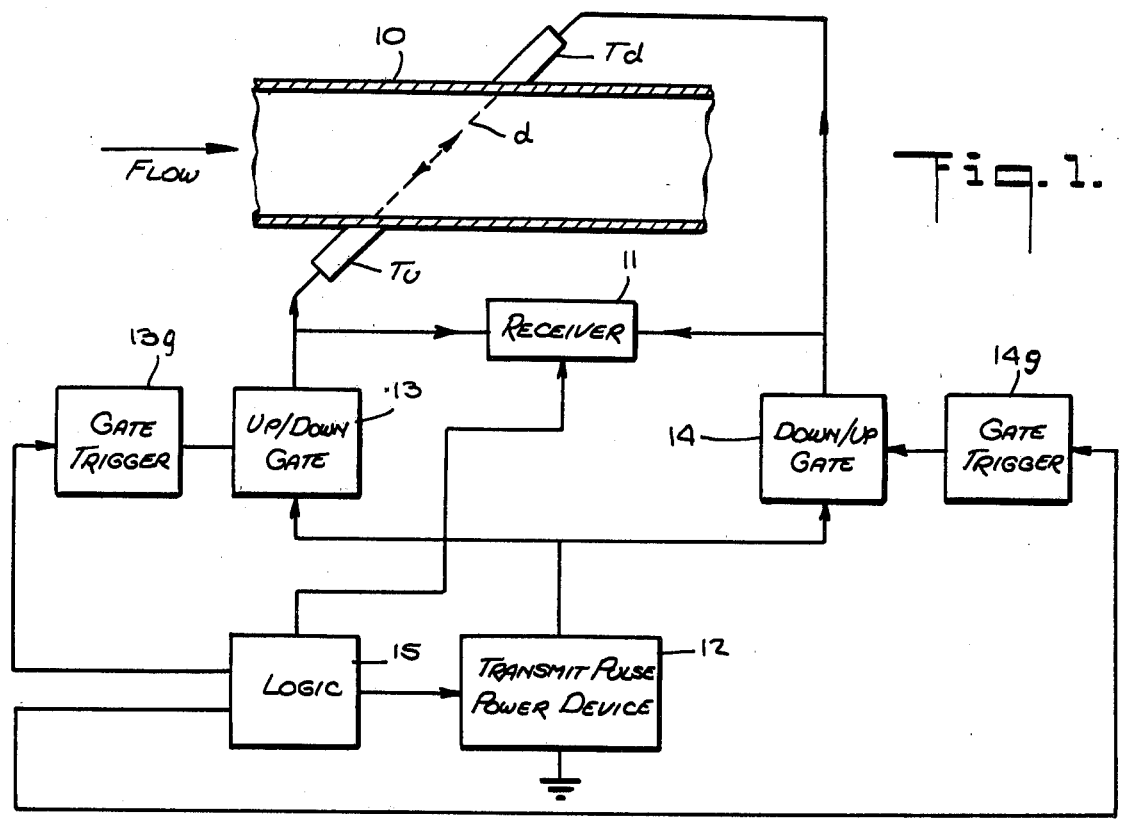

United States Patent [19]

Ryan et al.

[11] 4,397,193

[45] Aug. 9, 1983

[54] TRANSDUCER DRIVE CIRCUIT FOR ULTRASONIC FLOWMETER

[75] Inventors: Matthew C. Ryan, Lansdale; Daniel J. Soltz, Norristown, both of Pa.

[73] Assignee: Fischer & Porter Company, Warminster, Pa.

[21] Appl. No.: 251,753

[22] Filed: Apr. 7, 1981

[51] Int. Cl.³ .............................................. G01F 1/66
[52] U.S. Cl. .................................................. 73/861.28
[58] Field of Search ......................... 73/861.27, 861.28

[56] References Cited

U.S. PATENT DOCUMENTS

| | | | |
|---|---|---|---|
| 4,069,713 | 1/1978 | Gassmann | 73/861.28 |
| 4,202,210 | 5/1980 | Multon et al. | 73/861.28 |
| 4,204,240 | 5/1980 | Schmoock | 73/861.12 |
| 4,227,407 | 10/1980 | Drost | 73/861.28 |
| 4,232,548 | 11/1980 | Baumoel | 73/861.28 |

OTHER PUBLICATIONS

S. P. Gazetov-Measurement Techniques, vol. 18, No. 10, pp. 1476–1479, Oct. 1975.
N. E. Pedersen et al.-NBS Publication 484, pp. 293–318, Oct. 1977.

Primary Examiner—Charles A. Ruehl
Attorney, Agent, or Firm—Michael Ebert

[57] ABSTRACT

An ultrasonic flowmeter including a pair of alternately-excited upstream and downstream transducers, an acoustic pulse emitted by one transducer and propagated through the fluid being received by the other. The time delay difference between the upstream and downstream transit times is measured to determine the flow rate of the fluid. A single pulse power generating device is employed to excite both transducers, the device being coupled to the transducers through respective gates, each activated by an associated gate driver. Also included are logic means to periodically activate the device to produce power pulses and to alternately activate the gate drivers to cause the pulses to pass through alternate gates to excite one transducer and then the other.

2 Claims, 2 Drawing Figures

TRANSDUCER DRIVE CIRCUIT FOR ULTRASONIC FLOWMETER

BACKGROUND OF INVENTION

This invention relates generally to ultrasonic systems for measuring the flow of liquid through a pipe, and more particularly to a pulse power generating arrangement for the upstream and downstream transducers of the system.

The use of ultrasonic techniques to determine the flow rate of a liquid flowing through a pipe is well known. In a system of this type, such as those disclosed in U.S. Pat. Nos. 4,103,551; 4,004,461 and 3,906,791, a pulse of acoustic energy is alternately emitted by a pair of ultrasonic transducers; one being placed upstream on the pipe at one end of a tilted diameter or diagonal; the other being placed downstream at the other end of the diagonal, the direction of tilt lying in the direction of flow.

In operation, first a pulse of ultrasonic energy emitted by the upstream transmitter and propagated through the fluid in the pipe along a path at an angle to the longitudinal flow axis is detected by the downstream transducer. Then a pulse emitted by the downstream transducer propagated through the fluid along the same path is detected by the upstream transducer. The time delay difference (that is, the upstream time minus te downstream time) between the generation of the emitted pulses and their reception is a function of flow velocity and therefore is convertible into a flow rate reading.

In some ultrasonic flowmeter systems, the upstream and downstream transducers are clamped onto the pipe on the same side thereof, in which case the pulse emitted by one transducer is propagated through the fluid toward the opposite side of the pipe from which it is reflected toward the other transducer. But whether the two transducers are on the same side or on opposite sides of the pipe, the operation of the flowmeter depends on the time delay difference between the up-down and down-up transit times.

It has heretofore been the practice, in driving the upstream and downstream transducers of an ultrasonic flowmeter, to provide a separate high-voltage pulse generator for each transducer. Thus in the U.S. Pat. No. 4,195,517 of Kalinoski et al., whose entire disclosure is incorporated herein by reference, the upstream transducer is provided with a pulse-generating charge/fire circuit, and the downstream transducer is provided with a separate pulse-generating circuit. These circuits are triggered by means of pulses applied thereto at appropriately timed intervals by a digital microprocessor which also acts to measure the acoustic propagation times. Similarly, in the British Pat. No. 1,508,636, the upstream and downstream transducers are driven by separate power pulse generators to which start pulses are applied; the start pulses applied to one generator being displaced in time relative to those applied to the other to avoid a conflict between the pulses emitted by each transducer and the pulses received thereby.

We have found that when one compares the absolute times of the leading edges of the power pulses applied by separate generators to upstream and downstream transducers with reference to the start time of the system, that the upstream and downstream times are not exactly equal but are slightly displaced. This is due to differences in the turn-on time of the generators; for no two pulse power generators, though seemingly identical in circuit design, possess precisely the same turn-on time.

Thus it may be that the upstream pulse generator takes slightly more time to turn on than the downstream generator, this time displacement giving rise to a time difference between received ultrasonic signals. The system interprets the turn-on time displacement between the upstream and downstream pulse generators as a zero flow offset, this being added to the time difference factors of the acoustical coupling devices, the pipe, and fluid conditions in the pipe.

One can calibrate out this zero offset, but in doing so, one does not cancel the effect of temperature on the reading; for the upstream minus the downstream time difference at zero flow renders the system sensitive to temperature changes. Hence even a slight difference in the turn-on times of separate pulse power generators is detrimental to the accuracy of the system.

It is also to be noted that in many known types of ultrasonic flowmeters, the receiver is common to the upstream and downstream transducers, and that the microprocessor which includes logic to separate upstream and downstream pulses, to selectively gate the low-level transmit pulses and to perform measuring functions, is shared by the transducers, the only non-shared electronics in the system being the separate pulse power generators for the transducers.

SUMMARY OF INVENTION

In view of the foregoing, the main object of this invention is to provide a single pulse power-generating device for the upstream and downstream transducers of an ultrasonic flowmeter, to thereby minimize the time displacement between the upstream and downstream transducer pulses with reference to the start time.

A significant advantage of a single pulse power-generating device in accordance with the invention is that it does away with the need to calibrate out the time displacement resulting from disparate turn-on characteristics of separate pulse generators, and it also eliminates the adverse effect of changes of temperature on the time delay difference between the upstream and downstream transit times.

Yet another object of the invention is to provide an ultrasonic flowmeter of simplified design which operates efficiently and reliably.

Briefly stated, these objects are attained in an ultrasonic flowmeter including a pair of alternately-excited upstream and downstream transducers, an acoustic pulse emitted by one transducer and propagated through the fluid being metered being received by the other transducer, the time delay difference between the upstream and downstream transit times being measured to determine the flow rate of the fluid.

A single pulse power generating device is employed to excite the transducers, the device being coupled through respective gates to the transducers, each gate being activated by an associated gate driver. Also included are logic means to periodically activate the device to produce power pulses and to alternately activate the gate drivers to cause the power pulses to pass through alternate gates to excite one transducer and then the other, each gate being activated before the power pulse appears, whereby the turn-on characteristics of the gate have no effect on excitation of the transducer.

OUTLINE OF DRAWINGS

Figure 2:
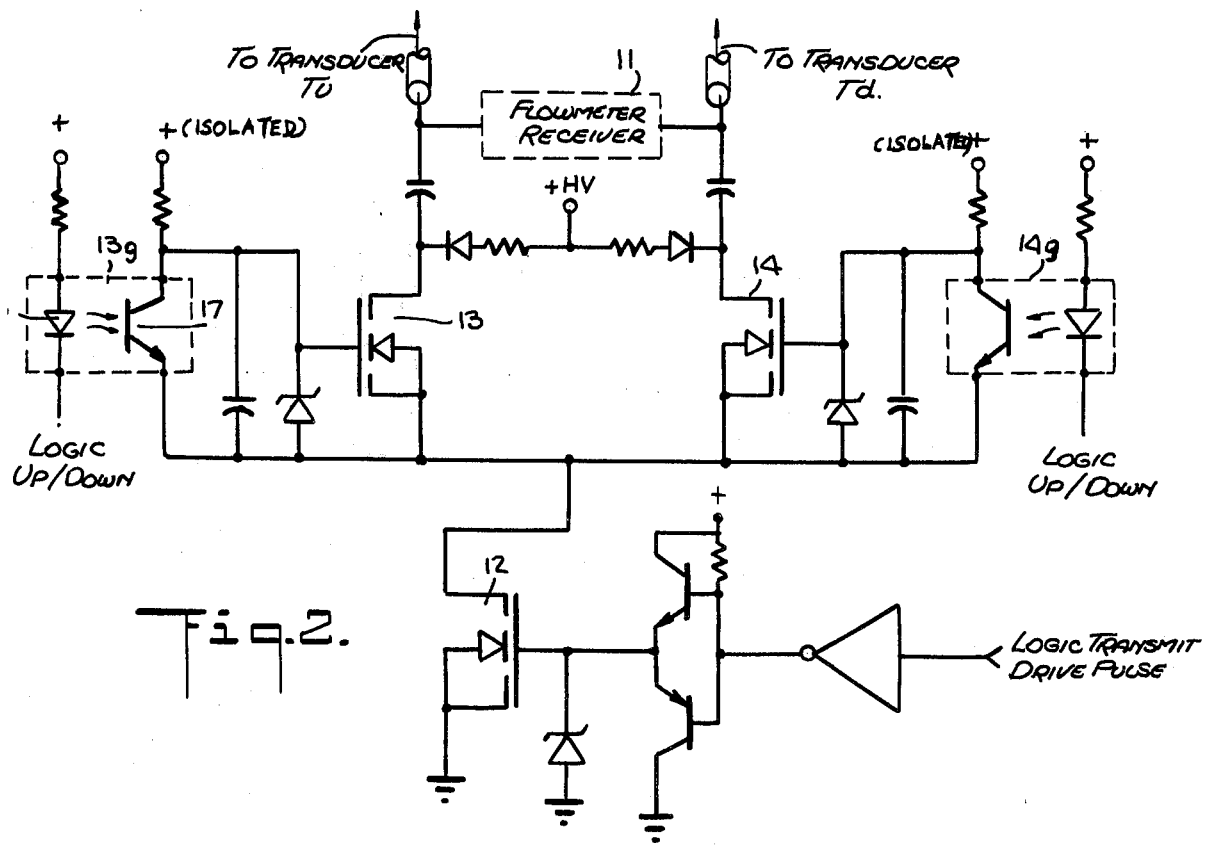

For a better understanding of the invention as well as other objects and further features thereof, reference is made to the following detailed description to be read in conjunction with the accompanying drawings, wherein:

FIG. 1 is a block diagram of an ultrasonic flowmeter which includes a power driver arrangement in accordance with the invention; and FIG. 2 is a schematic circuit diagram of the power driver arrangement.

DESCRIPTION OF INVENTION

Referring now to FIG. 1, there is shown a pipe 10 through which a fluid to be metered is conducted in the direction indicated by the arrow. Mounted on one side of the pipe at a suitable angle is an upstream transducer $T_u$, while mounted on the other side of the pipe at a suitable angle is a downstream transducer $T_d$. These transducers are alternately excited to generate acoustic pulses.

When the upstream transducer is excited, the resultant acoustic pulse is propagated through the fluid in the pipe along a path d at an angle to the longitudinal flow axis and picked up by the downstream transducer, the received pulse being fed to a receiver 11 which determines the downstream transit time between the emission of the pulse and its reception. When the downstream transducer is excited, the acoustic pulse travelling along path d and received by the upstream transducer is fed to receiver 11 which determines the upstream transit time, the difference in transit times being measured in the usual way to determine the flow velocity. Since the electronic circuits to carry out these measurements are well known, they will not be further detailed herein.

The concern of the present invention is with the transmit pulse power arrangement for the two transducers, a single pulse power generating device 12 being provided for this purpose to avoid the differences in turn-on time which are experienced when separate power devices are used.

The pulse output of power generating device 12 is applied to upstream transducer $T_u$ through an electronic gate 13, and to downstream transducer $T_d$ through an electronic gate 14. Gate 13 is rendered operative for a predetermined period by a gate driver $13_g$, and gate 14 is rendered operative by a gate driver $14_g$.

Logic 15 is provided to coordinate the functions of the pulse power generating device 12, gate drivers $13_g$ and $14_g$, and receiver 11.

When upstream transducer $T_u$ is to transmit and the downstream transducer $T_d$ is to receive, logic 15 applies a high input to gate driver $13_g$ and a low input to gate driver $14_g$ which renders gate 13 operative and which holds gate 14 in its disabled state. Logic 15 then applies a high input to pulse power generating device 12 which produces a power pulse, the pulse being applied only to upstream transducer $T_u$ through open gate 13, gate 14 being closed. Logic 15 thereafter applies a high input to receiver 11 to render this receiver operative to pick up the acoustic pulse received by downstream transducer $T_d$. In this way, the operation of the receiver is gated to discriminate against all signals other than the received acoustic pulses.

When downstream transducer $T_d$ is to transmit, logic 15 carries out the reverse operation, and first gate 14 is turned on and the power device 12 is actuated to apply a power pulse to transducer $T_d$.

It is to be noted that the operating sequence is such that each gate is turned on before the pulse power generating device is activated. In this way, any turn-on delay exhibited by the gate has no effect on the transducer timing, which effectively depends on the power device for both upstream and downstream transmission.

Referring now to FIG. 2 showing the schematic diagram of the pulse power generating arrangement, it will be seen that gate drivers $13_g$ and $14_g$ for gates 13 and 14, respectively, are in the form of photocouplers which electrically isolate the logic input applied to a light-emitting-diode 16 from the photo-diode 17 whose output is applied to the gate which passes the high voltage pulse generated by power generating device 12.

While there has been shown and described a preferred embodiment of a transducer drive circuit for ultrasonic flowmeter in accordance with the invention, it will be appreciated that many changes and modifications may be made therein without, however, departing from the essential spirit thereof.

We claim:

1. An ultrasonic flowmeter provided with upstream and downstream transducers placed in a flow pipe, each transducer, when excited, generating an acoustic pulse which is propagated through the fluid passing through the pipe before being detected by the other transducer, and a drive arrangement to alternately excite the transducers, said arrangement comprising:

A  a pulse power generating device, which when activated, generates a power pulse for exciting either transducer;

B  first and second gates coupling the device to the respective upstream and downstream transducers;

C  a gate driver associated with each gate;

D  logic means to peridically activate the device to produce power pulses and to alternately activate the gate drivers whereby the power pulses are applied through alternate gates to excite one transducer and then the other, said logic means being arranged to activate each gate driver before it activates the power device, whereby any turn-on delay exhibited by the gate associated with the driver has no effect on the timing of the excited transducer; and E  receiver means responsive to the acoustic pulses received by the transducers to determine the time delay difference between the upstream and downstream transit times; said receiver being activated by said logic means at a point in time after it activates the power device so that the receiver discriminates against signals other than the received acoustic pulses.

2. An ultrasonic flowmeter as set forth in claim 1, wherein said gate drivers are constituted by photocouplers.

* * * * *